(12) United States Patent
Williams et al.

(10) Patent No.: US 7,206,708 B2
(45) Date of Patent: Apr. 17, 2007

(54) LIFECYCLE SUPPORT SOFTWARE TOOL

(75) Inventors: Zachary C. Williams, St. Charles, MO (US); Dudley R. Adkins, Foristell, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/770,672

(22) Filed: Feb. 2, 2004

(65) Prior Publication Data

US 2005/0171732 A1    Aug. 4, 2005

(51) Int. Cl.
*G01N 37/00* (2006.01)
(52) U.S. Cl. .......................................... 702/83; 702/170
(58) Field of Classification Search .................. 702/83, 702/181, 34, 170; 333/206; 585/525
See application file for complete search history.

(56) References Cited

U.S. PATENT DOCUMENTS 5,900,735 A * 5/1999 Yamamoto ................... 324/537
6,487,518 B1 * 11/2002 Miyazaki et al. ............. 702/170
2003/0078741 A1 * 4/2003 Storino .......................... 702/34
2004/0044499 A1 * 3/2004 House et al. ................. 702/181

* cited by examiner

*Primary Examiner*—John Barlow
*Assistant Examiner*—Xiuqin Sun
(74) *Attorney, Agent, or Firm*—Ingrassia Fisher & Lorenz, P.C.

(57) ABSTRACT

The invention provides a simulation process and method of utilizing it to time to better estimate when a component of a product is about to fail by tracking varying "environmental factors" related to the severity of conditions to which product is exposed over a period of time. The invention includes the steps of:
(a) determining a distribution of mean times between failures or failure rate for each component of the product;
(b) using statistical techniques to select a fail point for each component;
(c) applying an aging factor for each component for conditions to which the product is subjected; and
(d) calculating an estimated time for failure for a component using information comprising time periods the component was subjected to conditions, and aging factors relating to the conditions.

16 Claims, 2 Drawing Sheets

LIFECYCLE SUPPORT SOFTWARE TOOL

BACKGROUND OF THE INVENTION

1. Field of the Invention

This invention relates to the field of software, and more particularly to software based simulation tools that use process simulation techniques to assess the performance reliability of products that are made up of multiple components, each component having a reliability distribution.

2. Description of the Related Art

In general, products that have multiple components fail in their intended purpose when a component necessary for the product to perform the function for that purpose fails. By way of illustration, when an automobile, which has many components, has the mission of transporting a commuter to and from work suffers a failure of an electrical component that is necessary for the engine to operate, the automobile is stalled and unable to fulfill its mission. The auto might also serve other purposes, for example transporting people at night to social events. In that case, the failure or burnout of the headlamps of the car makes it unsafe to use at night, and so it cannot fulfill a subsidiary, but nonetheless important, intended purpose.

It would be useful to the user of a product to know, or to have some idea, when a component will fail that would create an inconvenience or that would impair the usefulness of the product. In markets where many manufacturers compete to make sell a consumer product, the manufacturer conducts tests to determine component reliability and sets specifications for manufacture that often reflect some reliability goals. Based on an understanding of the reliability of components, gathered from actual failures of components in use, or from test data, or both, a manufacturer can develop a "limited warranty" program. Such a program offers some compensation (cash, or component repair or replacement) to a purchaser whose product has a component failure before the component has reached a certain age or has been in use for a certain time period. Thus, for example, auto manufacturers offer "limited drivetrain warranties" based on the expected trouble free life (measured in mileage used, or age) of the drivetrain they supply. In doing so, manufacturers bear in mind that some few might fail before the warranty period, and that compensation then must be paid. But, manufacturers usually have carried out a cost benefit analysis, using statistical and financial techniques, from which they can determine that the number of failures in the warranty period and the cost of compensation is significantly outweighed by increased sales of their autos (attributable to the limited warranty), and the increased profits from these sales.

Of course, the consumer product model explained above does not apply to all kinds of products. For example, in the market for large commercial aircraft that carry hundreds of passengers, mission failure cannot be tolerated as readily as in the automotive industry. Accordingly, other techniques are used. In general, these are based on testing of components to determine rates of wear and component life, and observing component wear and life in service. Based on these, regular scheduled maintenance procedures are applied to replace each component on a routine basis before it reaches a point of failure. This technique is also used in other capital industries where the continuous reliable operation of large machines is necessary or critical.

There are also other areas where reliability of mission performance poses challenges. For example, some products are manufactured in bulk, and stored for a long period before their intended use. These products each a have a shelf life based on the rate of degradation of their components under storage conditions. For example, a pharmaceutical company may manufacture a medicine that contains several chemical compounds in batches at intervals and supply pharmacies from its inventory. Under these conditions, it is necessary to ensure that the beneficial chemical composition of the medicine not degrade during the storage period. Generally, pharmaceutical companies mark their products with an "expiration date" that is a date after which the company cannot guarantee that the medicine retains its potency. The pharmaceutical industry is not the only one faced with these issues of batch production and storage. Some industries have an added complication that their products have chemical, electronic and mechanical components or subsystems that are each prone to degradation with age, and mission performance reliability must be estimated in some manner.

SUMMARY OF THE INVENTION

The invention provides a method, amenable to being programmed into a computer, that tracks varying "environmental factors" related to the severity of conditions to which product is exposed over a period of time to better estimate when a component of the product is about to fail. As a result, implementation of the invention provides a wide range of benefits. For example, in one aspect of the invention, manufacturers of products, for which the manufacturer usually provides a warranty of performance, are better able to estimate the number of failures that will likely occur over a period of time, including fluctuations in the number of failures that might be caused by factors such as high production rates, high usage, harsh environments during certain time periods, and the like. Further maintenance personnel using the invention would be better able to schedule preventive maintenance, potentially resulting in cost savings. In addition, for products that are made in large batches over short periods of time, and then stored for subsequent use, the invention provides a better method for determining when to take products out of storage for testing, and/or for determining what proportion will fail after elapse of time. In addition, implementation of the invention will permit the assessment of support costs of large populations of aircraft or other comparable complex systems over their entire intended existence before actual production even commences. This permits decision-makers more flexibility. For example, the decision-maker can account for support resources and costs very early in product development. The invention also permits decision-makers the option of choosing other subsystems that might require lower support costs but higher up front costs.

In accordance with one embodiment of the invention, the end of "life" for reliable mission performance capability of a product having multiple components and subject to a plurality of "environmental conditions" of use, is estimated. In this embodiment, the method includes the steps of:

(a) determining a distribution of mean times between failures or failure rate for each component of the product;

(b) using statistical techniques to select a fail point for each component;

(c) applying an aging factor for each component for conditions to which the product is subjected; and (d) calculating an estimated time for failure for a component using information comprising time periods the component was subjected to conditions, and aging factors relating to the conditions.

The calculation step is carried out periodically or continuously, and once a failure of a component is determined, predetermined action can be taken. The generation of a failure time can be used to initiate a range of actions, for example, the product can be repaired or tracked as "failed but not found" (a virtual test), allowing the health of a population to be predicted. The step of determining likely failure of the component at issue is based on comparing the cumulative environmental times (i.e. "reliability clock", as defined below) with a fail point generated from the distribution of mean to failure, as explained in more detail here below. The distribution for the generation of "random" fail points can be almost any statistical function, but is typically a normal uniform or weibull distribution.

In another embodiment, the product is one of a multiplicity of products that are substantially identical, such as items coming off a production line, and have the same components. In this instance, the invention includes determining the projected maintenance or life cycle of the identical products and the method includes the steps of:

(a) determining an aging factor for the at least one common component of each of the multiplicity of products for each condition to which the product is subjected;

(b) calculating, for the component, at predetermined intervals or continuously, a product of the time period for which the component was exposed to a condition, and an aging factor relating to the condition;

(c) summing the products of aging factors and time periods of exposure, at predetermined intervals or continuously;

(d) comparing, for the component, the latest sum of products of aging and time periods of exposure, with a predetermined fail point for the component; and (e) generating an alert when the latest sum of products equals or exceeds a predetermined fail point of the component.

By taking into account environmental factors that have an effect on the life of a component of the product, the invention provides a better assessment of likely point of failure and permits better calculation of warranty liability, preventive maintenance intervals, or removal of the product from service or storage for disposal. The invention can be applied to a product as a whole, or subsystems of a product, or parts within any or all of the subsystems, as may be appropriate.

The foregoing is a summary of some aspects and benefits of the invention, and a more detailed description is provided here below. A person of ordinary skill in the art having read this disclosure will readily appreciate additional advantages and benefits, and these are within the scope of the invention as encompassed by the scope of the appended claims.

BRIEF DESCRIPTION OF THE DRAWINGS

The following illustrative drawings are not to scale, and are intended only to facilitate understanding of the invention. The drawings do not limit the scope of the invention, which is set forth in the claims appended here below.

Figure 1:
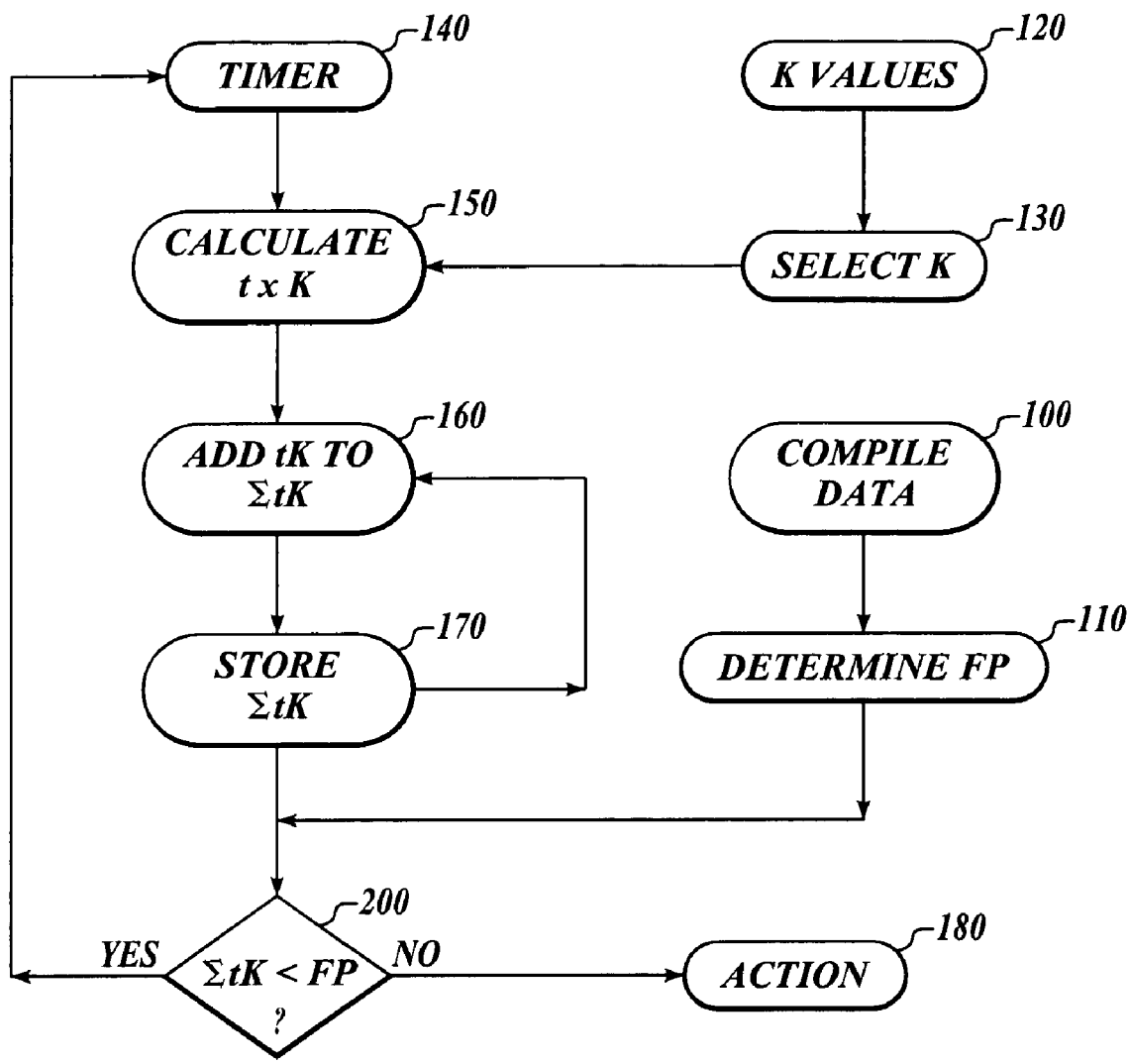
FIG. 1 is a schematic flow diagram illustrating aspects of an embodiment in accordance with the invention.
Figure 2:
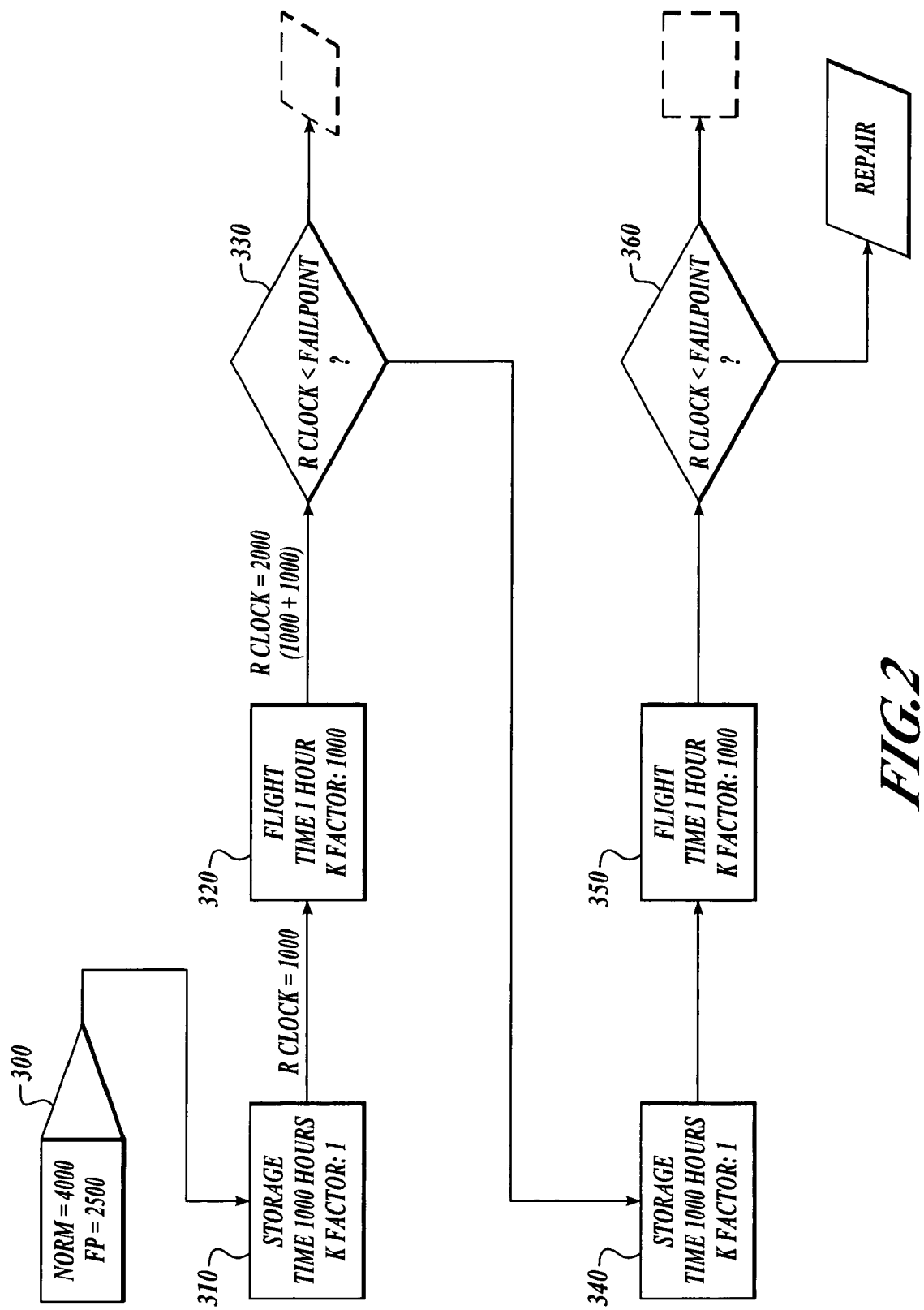
FIG. 2 is a schematic flow diagram illustrating an example in accordance with the invention.

The foregoing drawing should be understood in light of the more detailed description of embodiments that follows, here below.

DETAILED DESCRIPTION OF THE PREFERRED EMBODIMENTS

The invention provides a system and method amenable for use on a computer for better predicting the life cycle of a component of a product by taking into account that product or component reliability is affected by the environment in which it operates or is stored.

In the specification and claims, the term "life cycle" means the useful life of the component at issue, and that means that the component is able to perform its intended function in the product so that the product is able to perform its designated mission.

In the specification and claims, the term "environment" used in connection with aging means the conditions under which the product or component operates that have an effect on life cycle. Thus, depending upon the nature of the product or component, the environment of concern will vary, but generally may include, for example, temperature, pressure, vibration, noise, humidity, acidity, alkalinity, and the like factors to which the product or component is exposed. In addition the term "environment" may also encompass whether the product is in use or being inventoried, or otherwise stored and not being used. Each environment has an associated "aging factor" that is a measure of the severity of the environment in adversely affecting life cycle. For example, aluminum is known to be prone to acid attack, so an acidic environment would have a higher aging factor for an aluminum component than a neutral environment. So, the acidic environment might have an aging factor of 1000 relative to 1 for a neutral environment, if the aluminum degrades at a rate 1000 times greater in the acidic environment than the intended environment of ordinary use.

In the specification and claims, the term "component" is not limited to components of a product, but refers to any portion of the product to which aging factors are applied for different environments, and so the term may mean the entire product as a whole (if the K factors are applicable to the entire product) or a subsystem of the product, or a subassembly within the subsystem, or a part within a subassembly, as applicable under the circumstances. Thus, for example, an auto manufacturer can carry out the simulation process of the invention based on an entire vehicle, that has K factors for a range of environmental conditions, or it can base the simulation on the engine, transmission, electronic, etc. subsystems that each have K factors, or even further in more detail on parts of these subsystems. The degree of specificity is perhaps limited only by factors such as cost to obtain data to develop K factors, computing power for simulation, and the like, but in principle, the invention can be applied to any degree of specificity necessary or desirable.

The term "reliability clock" as used in the specification and claims means a pseudo time taking into account aging factor. Thus, the reliability clock is the sum of (aging factor×time period exposed to the environment associated with the aging factor) for the life of the component at issue to date. For example, commencing a product life at time=0, then some time later, at time=T, the reliability clock would be $(t_1 \times K + t_2 \times K_7 + t_3 \times K_3 + t_4 \times K_5)$ where: the total elapsed time $T$=time periods $t_1+t_2+t_3+t_4$; and when the component was in an environment with corresponding aging factor K for period $t_1$, and under environment with aging factor $K_7$ for $t_2$, under environment with aging factor $K_3$ for $t_3$, and under environment with aging factor $K_5$ for $t_4$.

An explanatory embodiment of the invention is depicted schematically in FIG. 1. Referring to this FIGURE, data about the life cycle of a component is compiled in block 100. These data may be obtained from actual field use of the component, or from tests, or may be mathematically deduced from properties of the component, as appropriate. Based on these data, typically a normal, weibull or uniform distribution, a random fail point can be calculated. From a distribution of the MTBFs a random fail point (FP) is determined in block 110 using, for example, a random number generator applied to statistical function, known as the Monte Carlo simulation method. A person of skill in the art would appreciate other techniques more applicable to specific circumstances and data. This FP is supplied to block 200, and used for comparison purposes, as explained later.

An array of the various environments in which the component will find itself is determined and associated K values are assigned, in block 120. As explained below, at various points in time, a calculation is performed that multiplies the time period by the K factor associated with the environment that the component was in for that time period. Accordingly, the appropriate K value for a particular time period's environment is selected in block 130.

The timer 140 commences at zero and marks time, like a clock, as of commencement of the life cycle of the component. Periodically, or continuously, block 150 receives a time input and an aging factor K appropriate for the environment in which the component is at the time and multiplies these two numbers. Thus the initial value might be 10 minutes at K of 1 for a product (reliability clock value) of 10. This product is added to any previous products (initially this is zero) in block 160. The total of the summed products, which is the reliability clock value, is stored in block 170, and is compared to the fail point (FP) in block 200. Assuming that the fail point is 85, for example, then the reliability clock is less than the fail point, and no alert is activated at block 180. The timer 140 continues, and at this time, assume the component was moved after the first 10 minutes to an environment with aging factor K=3 for a period of 3 minutes. Block 150 will then calculate t×K as (3×3) and block 160 will add this to the previous 10 for a reliability clock of 19, which is stored in block 170. The new reliability clock value is compared to the FP in block 200, and since it is still less than the FP, which is 85 in this example, there is no alert from block 180. In this manner, the reliability clock will continue to increase in value, as time passes and the increase is related to the aging factor K of the component's environment. Finally, the reliability clock calculated at block 160 exceeds or equals the fail point as compared at block 200. When this occurs, an alert or other action is initiated at block 200.

The foregoing explanation has focused on a one component system, but clearly the invention is most adaptable and useful in multi component systems. For a multi component system, block 120 would compile K values for each component separately, as these may vary by component, in the same environment. For example, humidity might affect the life cycle of a chemical component much more than stainless steel components. Similarly, block 100 would compile failure data for each component separately, and block 110 would calculate the FP for each component separately.

All of the foregoing is readily achieved using a computer with appropriate hardware and appropriately configured software. A person of ordinary skill in the art will readily understand this, upon reading this disclosure.

As to the timer and calculation sequence explained above, this is carried out for each component separately. As can be readily appreciated, one component may reach a reliability clock that equals or exceeds its fail point before other components. Thus, this component will cause an alert to remedial action of some kind: inspection, repair, replacement or disposal or is tracked to predict population health.

The following example illustrates one aspect of the invention, and is not limiting of the scope of the invention, as described above and claimed here below.

EXAMPLE

This example relates to an aircraft and is greatly simplified to illustrate an aspect of the invention. In this instance, the aircraft as a whole is the "component" to which aging factors are applied, depending upon the environment to which it is exposed.

In this example, in block 300, the MTBF (mean time between failures) was calculated as 4,000 hours, and a randomized fail point (FP) of 2,500 hours was determined for the aircraft using process simulation techniques. Thus a predicted failure for this particular aircraft is when the reliability clock, i.e. the sum of all [(K (aging factor) for environments to which it is exposed)×(time period of exposure)], is equal to 2,500.

In block 310 the aircraft is stored for 1,000 hours at an aging factor K=1.0; so the reliability clock is 1,000 after storage. Then, at block 320, the aircraft flies for 1.0 hour, at conditions with aging factor K=1,000. Thus, after block 320, the reliability clock is 1,000+(1.0×1,000)=2,000. This is less than the FP of 2,500, as shown in block 330. Thus no failure-based action is needed.

Next, in block 340, the aircraft is stored for another 1,000 hours at K=1.0. The reliability clock is now 2,000+(1,000× 1.0)=3,000, which exceeds the FP of 2,500. But, in this example, a comparison (simulating a post flight maintenance check) with the FP is not carried out yet. After a flight in block 350, the reliability clock is 3,000+(1.0×1,000)=4,000. A comparison in block 360 shows the reliability clock exceeding the FP and indicating repair is needed.

The above description of the invention is not limiting of the invention or its embodiments, whether disclosed or not. Any modifications to the described invention, that may be obvious to one skilled in the art, are encompassed in the patent claims, literally or under the doctrine of equivalents.

The invention claimed is:

1. A method of determining when a product should have a component of interest inspected, the method comprising:
 (e) determining a distribution of mean times between failures for each component of interest of the product;
 (f) using statistical techniques to select a fail point for each component of interest from the distribution of mean times for the respective component;
 (g) determining an aging factor for each component of interest for conditions to which the product is subjected;
 (h) determining a product of: time period for which a component of interest was subjected to a condition, and an aging factor associated with the condition;
 (i) summing, for the component of interest, products of aging factor and time under aging factor conditions, at predetermined intervals or continuously, to produce a total from the summing;
 (j) calculating an estimated time for failure for a component of interest using information comprising the total from the summing;
 (k) periodically or continuously, comparing the total from the summing for a component of interest with a fail point for that respective component; and (l) generating an alert when the total from summing for a component of interest equals or exceeds the randomly generated fail point for the respective component.

2. The method of claim 1, wherein the aging factor is not identical for each component of interest under the same environmental conditions.

3. The method of claim 1, wherein the fail point is randomly generated.

4. The method of claim 1, further comprising, for each identified component of interest, summing the product of aging factor and time under conditions for that aging factor, to determine, for each component of interest, a total of summed products at an instant in time.

5. The method of claim 4, wherein the step of summing is periodic or continuous.

6. The method of claim 4, further comprising, for each component of interest, comparing the total of summed products with a respective fail point for the component.

7. The method of claim 1, further comprising generating an alert when the total for any one of the components of interest equals or exceeds the fail point of that one component.

8. A method of determining a projected maintenance or life cycle of a product, the method comprising:
 (a) determining an aging factor for a component of the product for each condition to which the product is subjected;
 (b) calculating for the component, at predetermined intervals or continuously, a product of the time period for which the component was exposed to a condition, and an aging factor relating to the condition;
 (c) summing the products of aging factors and time periods of exposure, at predetermined intervals or continuously;
 (d) comparing the latest sum of products of aging and time periods of exposure with a predetermined fail point for the component; and
 (e) generating an alert when the latest sum of products equals or exceeds a predetermined fail point of the component.

9. The method of claim 8, wherein the aging factor varies based on whether the product is in use or at rest, and varies based on environmental conditions.

10. The method of claim 9, wherein the fail point of the component is determined statistically, based on a distribution of mean times between failure for the component.

11. The method of claim 8, wherein the product has multiple components.

12. The method of claim 11, wherein the steps of calculating, summing and comparing are carried out for multiple components separately.

13. The method of claim 11, wherein the aging factor is not identical for all components under each condition to which the product is exposed.

14. The method of claim 13, wherein the generating of an alert is when the first of multiple components has a sum determined by the step of summing that equals or exceeds the fail point of that particular component.

15. A method of determining a projected maintenance or life cycle of a multiplicity of substantially identical products, each product comprising at least one common component, the method comprising:
 (a) determining an aging factor for the at least one common component of each of the multiplicity of products for each condition to which the product is subjected;
 (b) calculating, for the component, at predetermined intervals or continuously, a product of the time period for which the component was exposed to a condition, and an aging factor relating to the condition;
 (c) summing the products of aging factors and time periods of exposure, at predetermined intervals or continuously;
 (d) comparing, for the component, the latest sum of products of aging and time periods of exposure, with a predetermined fail point for the component; and
 (e) generating an alert when the latest sum of products equals or exceeds a predetermined fail point of the component.

16. The method of claim 15, wherein the fail point is determined from a distribution of mean failure times for the common component, using statistical techniques.

* * * * *